US010674122B2

(12) United States Patent
Ando

(10) Patent No.: US 10,674,122 B2
(45) Date of Patent: *Jun. 2, 2020

(54) LIGHT SOURCE UNIT AND PROJECTION-TYPE DISPLAY

(71) Applicant: SONY CORPORATION, Tokyo (JP)

(72) Inventor: Masahiro Ando, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,357

(22) Filed: Jun. 18, 2019

(65) Prior Publication Data

US 2019/0306473 A1    Oct. 3, 2019

Related U.S. Application Data

(63) Continuation of application No. 16/056,684, filed on Aug. 7, 2018, now Pat. No. 10,368,042, which is a
(Continued)

(30) Foreign Application Priority Data

Nov. 25, 2014    (JP) ................................. 2014-237818

(51) Int. Cl.
*G03B 21/20*     (2006.01)
*H04N 9/31*      (2006.01)
(Continued)

(52) U.S. Cl.
CPC ............... *H04N 9/31* (2013.01); *G02B 27/10* (2013.01); *G03B 21/2013* (2013.01);
(Continued)

(58) Field of Classification Search
CPC ............... G03B 21/206; G03B 21/208; G03B 21/2013; G03B 21/2033; G03B 21/2053;
(Continued)

(56) References Cited

U.S. PATENT DOCUMENTS

2006/0279710 A1* 12/2006 Tani ..................... H04N 5/7458
353/85
2007/0103646 A1    5/2007 Young
(Continued)

FOREIGN PATENT DOCUMENTS

CN         103676145 A    3/2014
EP         2712194 A2     3/2014
(Continued)

OTHER PUBLICATIONS

International Search Report and Written Opinion of PCT Application No. PCT/JP2015/077438, dated Dec. 15, 2015, 15 pages of English Translation and 11 pages of ISRWO.
(Continued)

*Primary Examiner* — Sultan Chowdhury
(74) *Attorney, Agent, or Firm* — Chip Law Group

(57) ABSTRACT

A light source unit of the disclosure includes a plurality of light source sections, a light quantity detector, and a controller. The plurality of light source sections emit rays of colors different from each other. The light quantity detector receives a plurality of color rays emitted by the plurality of light source sections as spatially common light. The controller controls a light emission timing of each of the plurality of light source sections and a gain of the light quantity detector, and measures light quantities of the respective plurality of color rays at different timings and with different gains on a basis of a detection result of the light.

19 Claims, 12 Drawing Sheets

Related U.S. Application Data continuation of application No. 15/525,452, filed as application No. PCT/JP2015/077438 on Sep. 29, 2015, now Pat. No. 10,075,682.

(51) Int. Cl.
    *G02B 27/10*    (2006.01)
    *G03B 21/00*    (2006.01)
    *G03B 33/12*    (2006.01)

(52) U.S. Cl.
    CPC ....... *G03B 21/2033* (2013.01); *H04N 9/3111* (2013.01); *H04N 9/3155* (2013.01); *H04N 9/3167* (2013.01); *H04N 9/3194* (2013.01); *G03B 21/006* (2013.01); *G03B 21/208* (2013.01); *G03B 21/2053* (2013.01); *G03B 21/2066* (2013.01); *G03B 21/2073* (2013.01); *G03B 33/12* (2013.01); *H04N 9/3158* (2013.01)

(58) Field of Classification Search
    CPC .............. G03B 21/2066; H04N 9/3111; H04N 9/3155; H04N 9/3158; H04N 9/3161; H04N 9/3164; H04N 9/3194
    See application file for complete search history.

(56) References Cited

U.S. PATENT DOCUMENTS

| | | | | |
|---|---|---|---|---|
| 2008/0042578 | A1* | 2/2008 | Arai | ...................... G09G 3/3426 315/32 |
| 2010/0033508 | A1 | 2/2010 | Mizushima et al. | |
| 2011/0241990 | A1 | 10/2011 | Huang | |
| 2013/0278903 | A1 | 10/2013 | Lippey et al. | |
| 2014/0078474 | A1* | 3/2014 | Nakao | .................. H04N 9/3129 353/33 |
| 2016/0255313 | A1 | 9/2016 | Samejima et al. | |

FOREIGN PATENT DOCUMENTS

| | | |
|---|---|---|
| JP | 2004-207420 A | 7/2004 |
| JP | 2006-349731 A | 12/2006 |
| JP | 2014-077991 A | 5/2014 |
| WO | 2014/128883 A1 | 8/2014 |

OTHER PUBLICATIONS

International Preliminary Report on Patentability of PCT Application No. PCT/JP2015/077438, dated Jun. 8, 2017, 13 pages of English Translation and 06 pages of IPRP.

Notice of Allowance for U.S. Appl. No. 15/525,452, dated May 18, 2018, 09 pages.

Non-Final Office Action for U.S. Appl. No. 15/525,452, dated Dec. 8, 2017, 09 pages.

Non-Final Office Action for U.S. Appl. No. 16/056,684, dated Nov. 9, 2018, 08 pages.

Notice of Allowance for U.S. Appl. No. 16/056,684, dated Mar. 22, 2019, 09 pages.

Office Action for JP Patent Application No. 2016-561435, dated Aug. 27, 2019, 04 pages of Office Action and 04 pages of English Translation.

\* cited by examiner

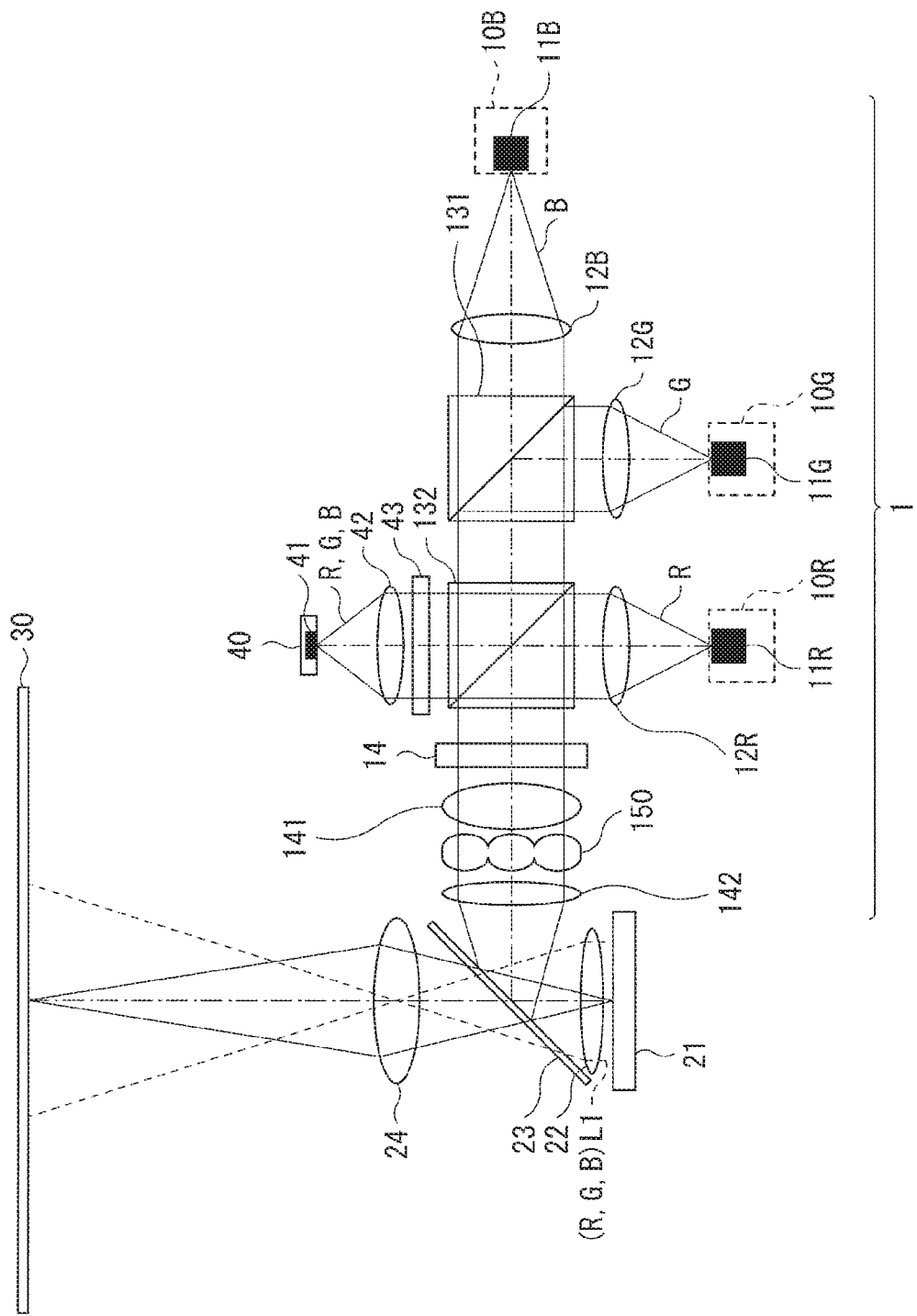
[FIG. 1]

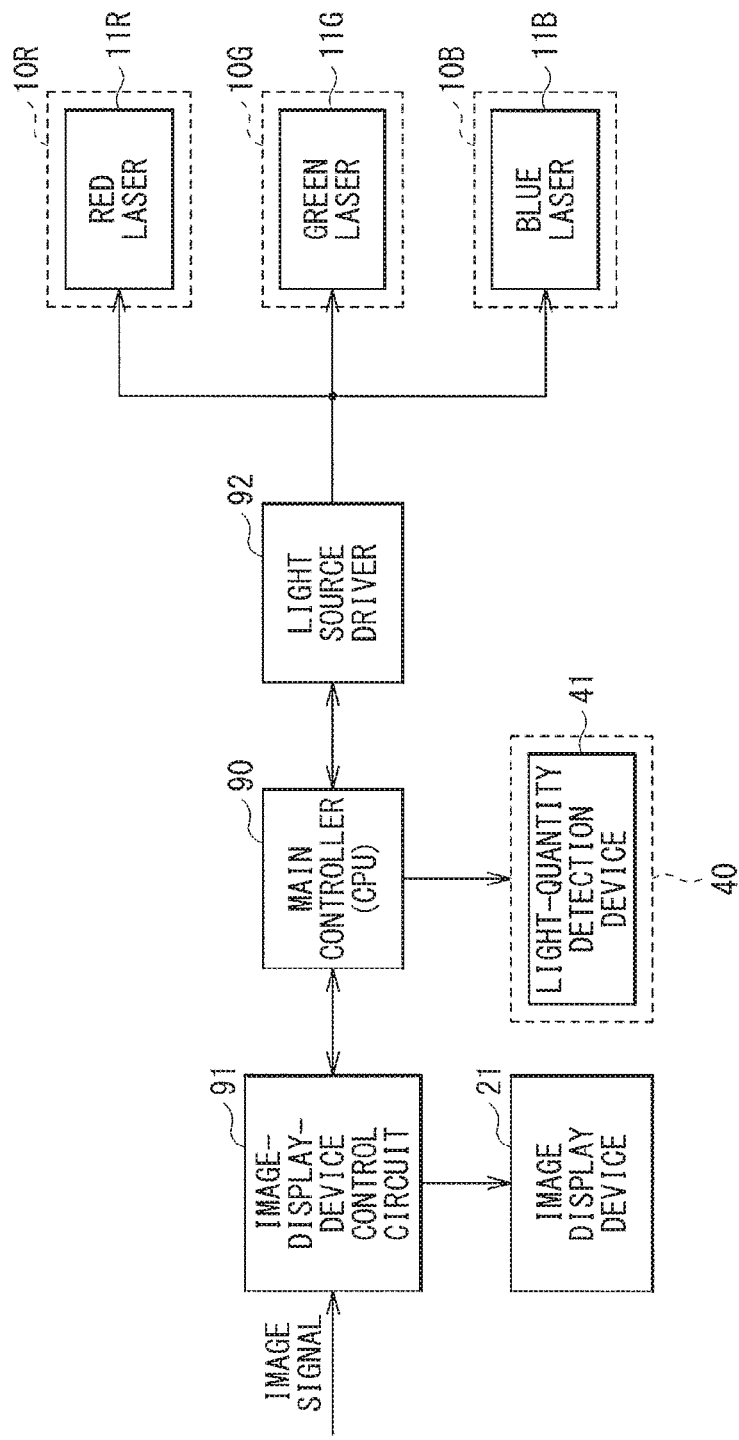
[FIG. 2]

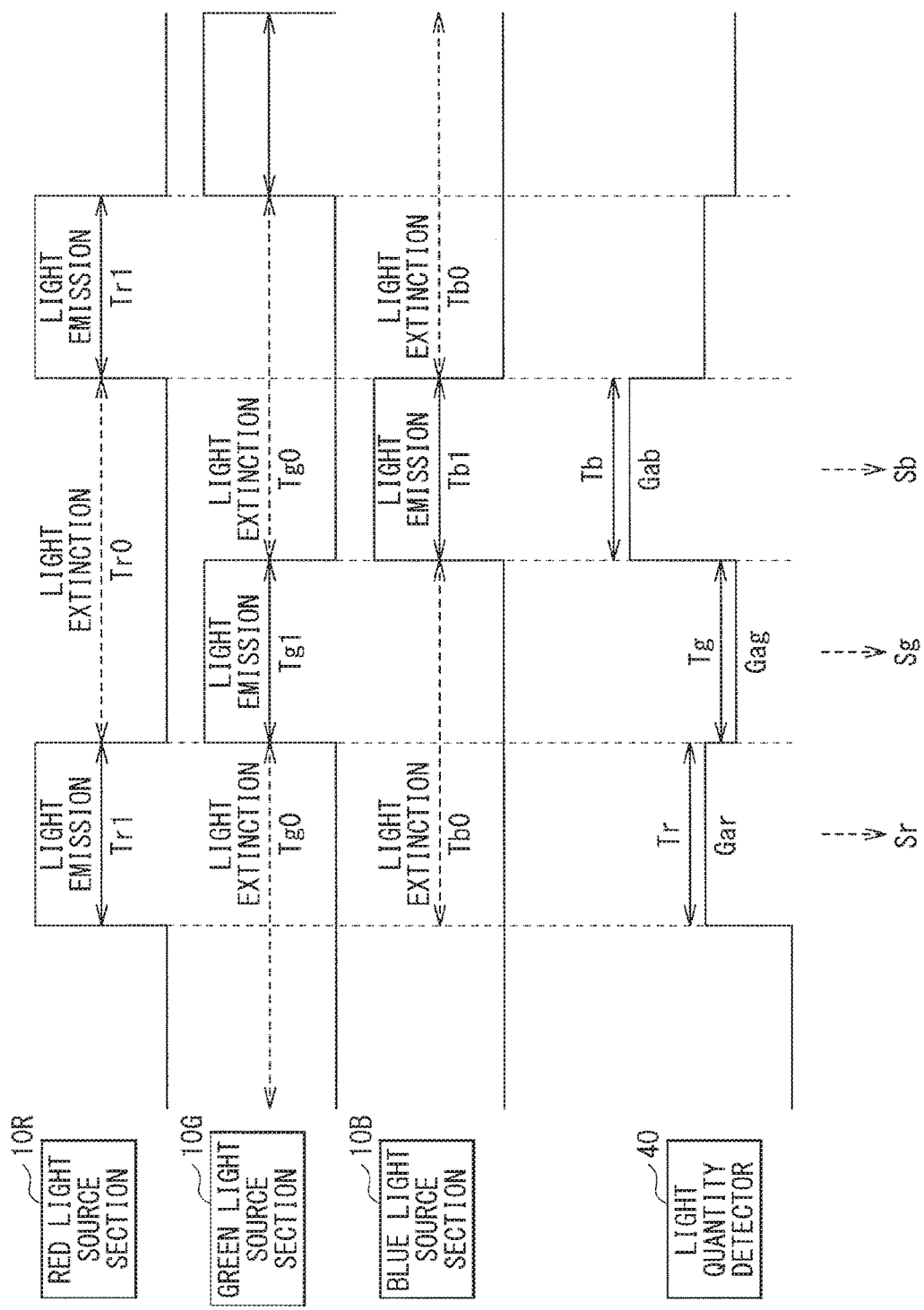

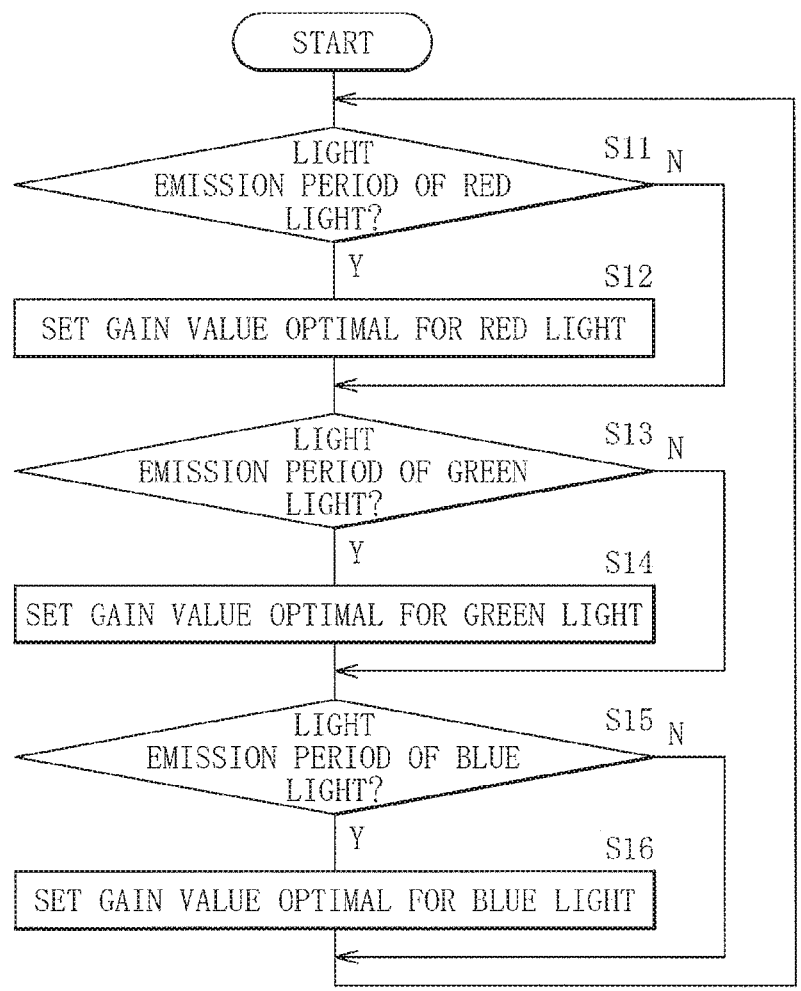
[FIG. 4]

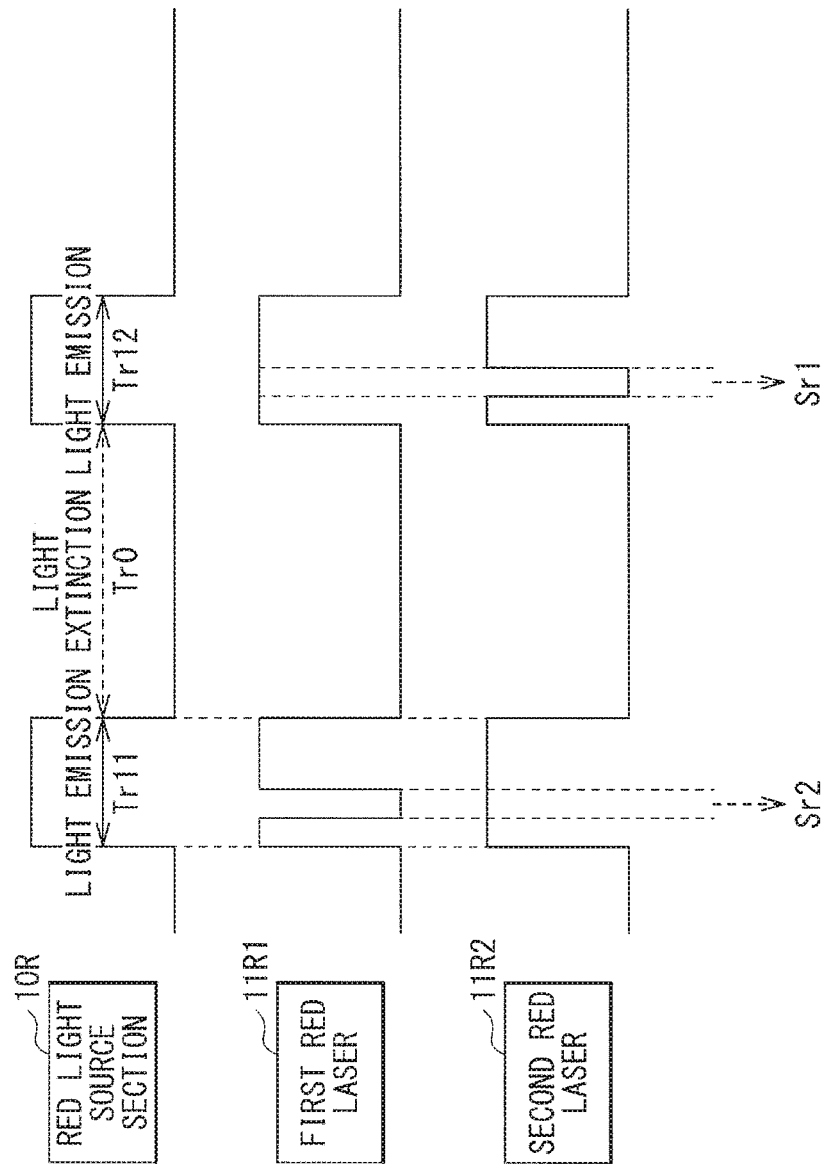

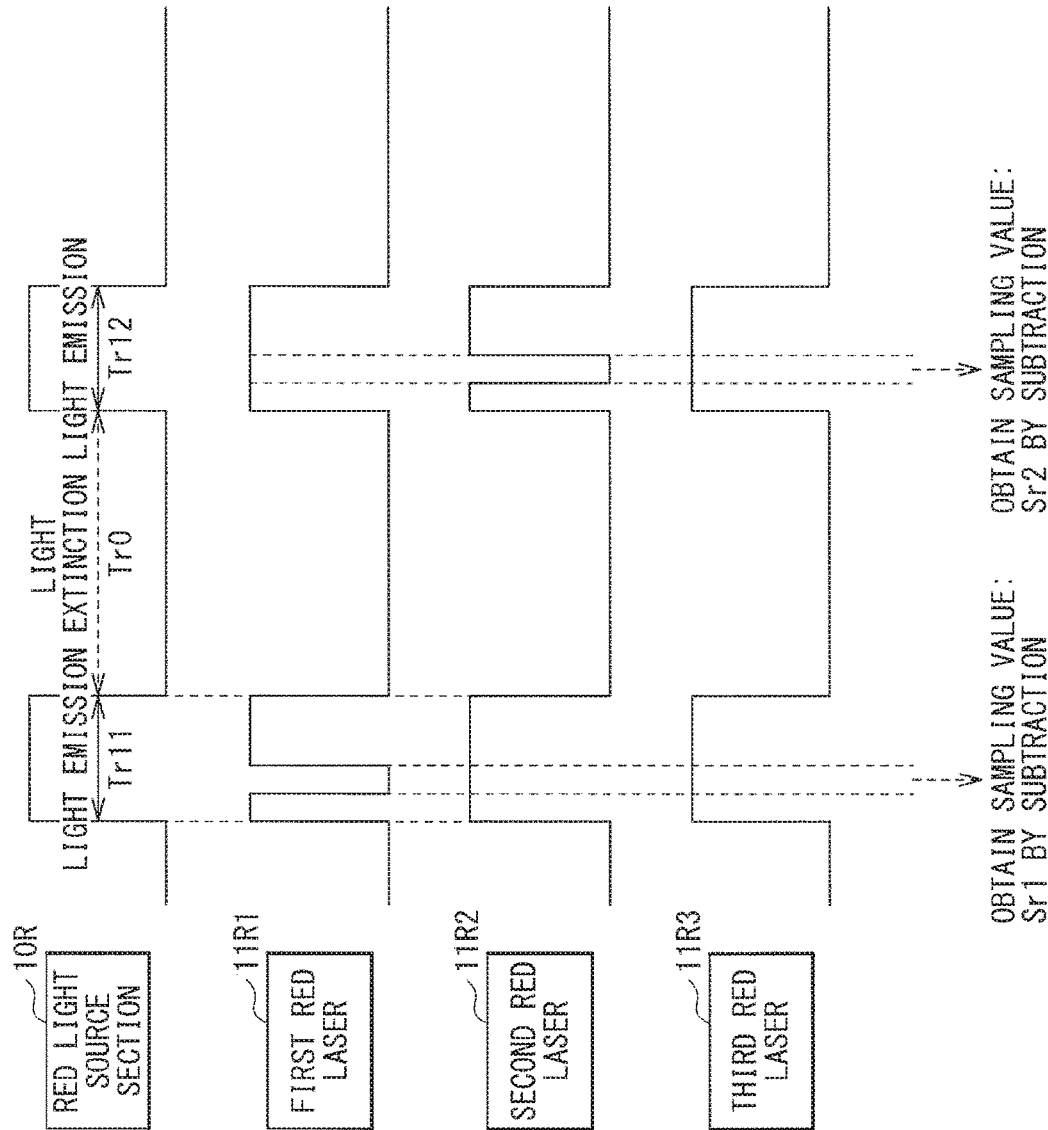

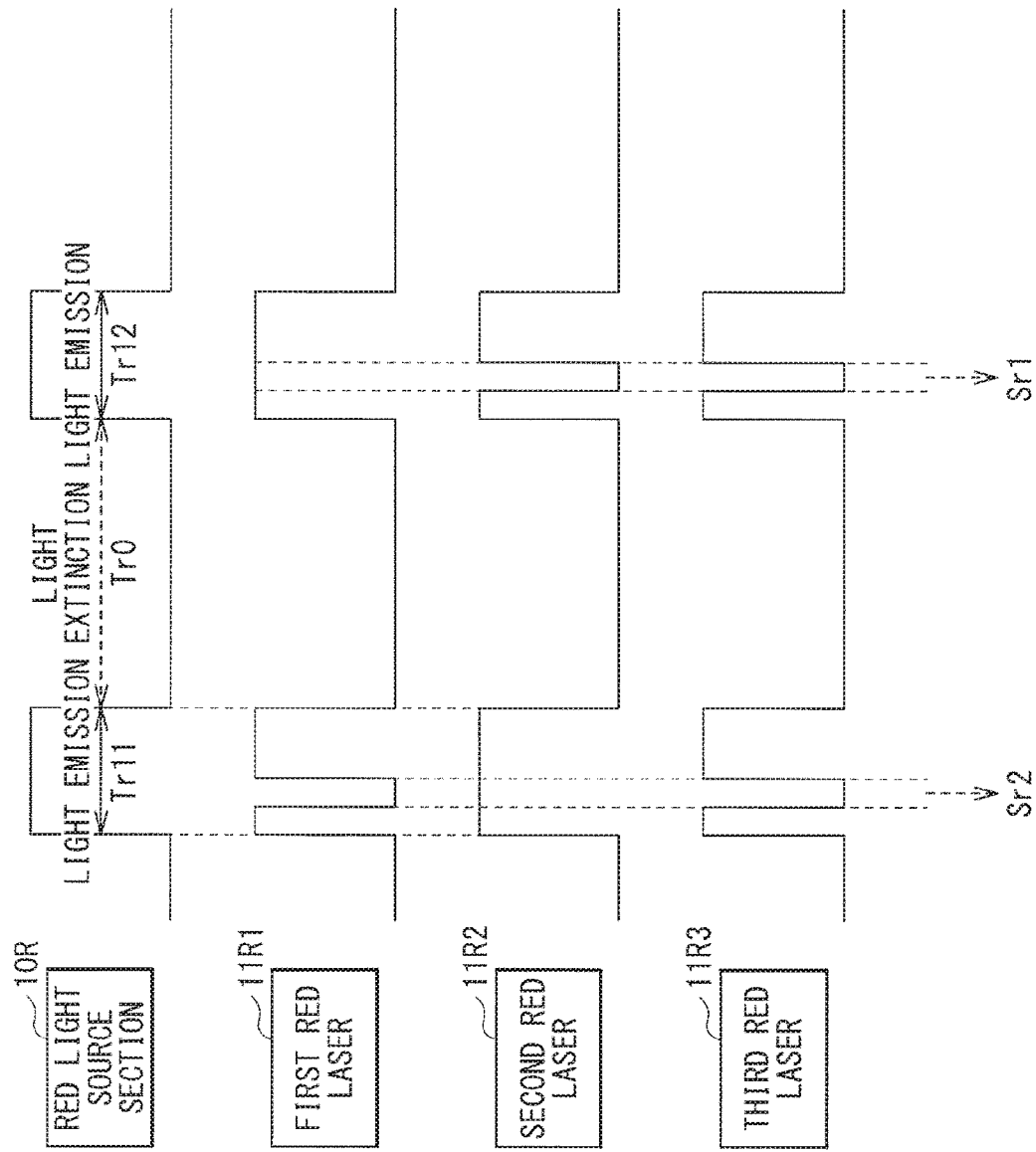
[FIG. 7]

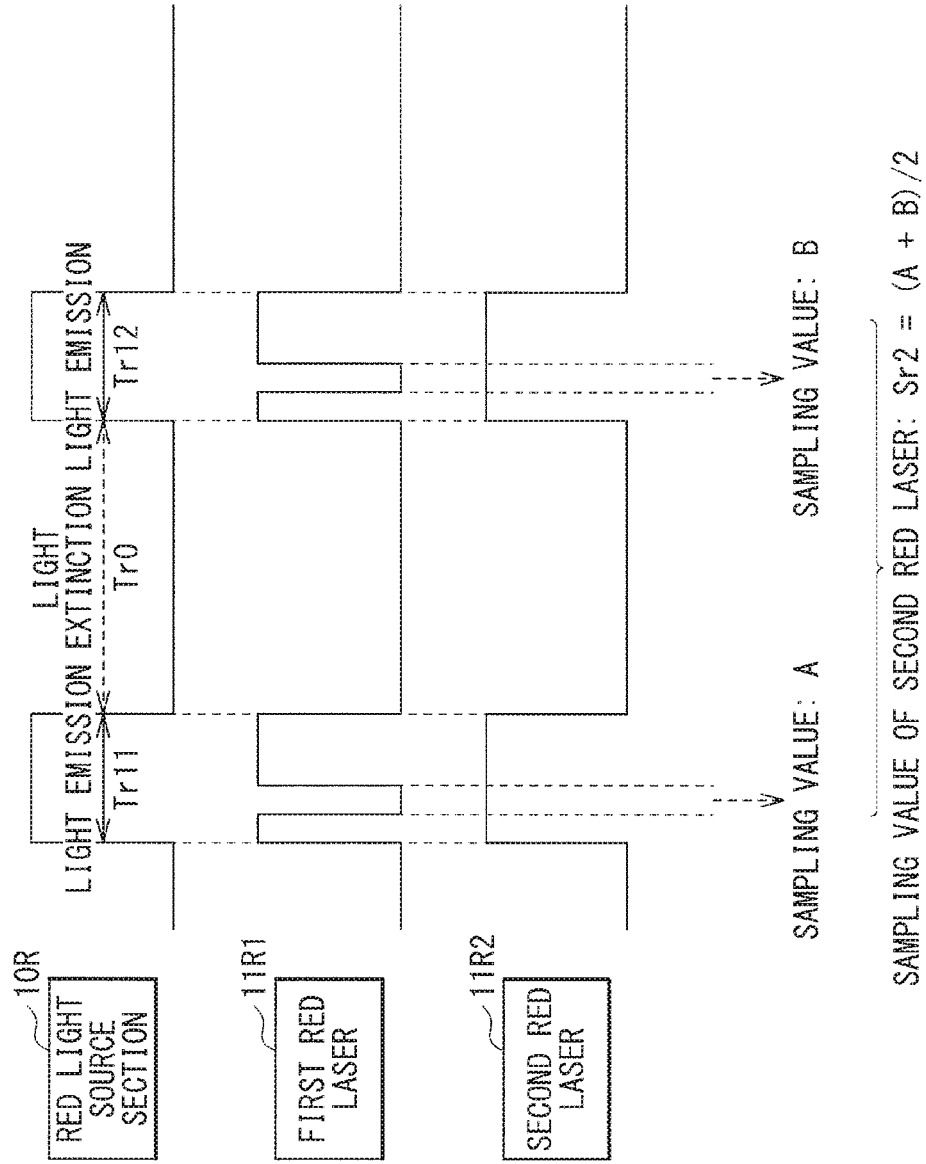
[FIG. 8]

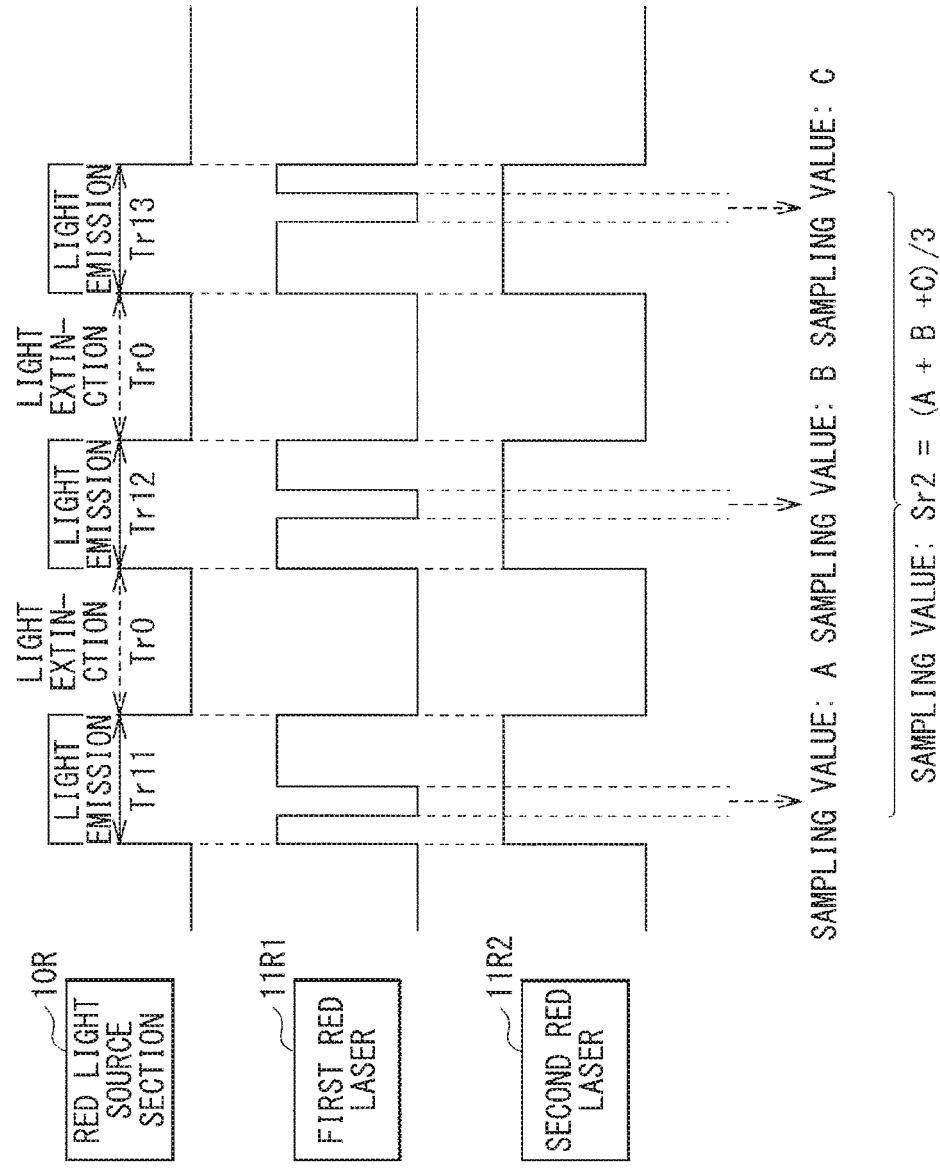
[FIG. 9]

[FIG. 10]
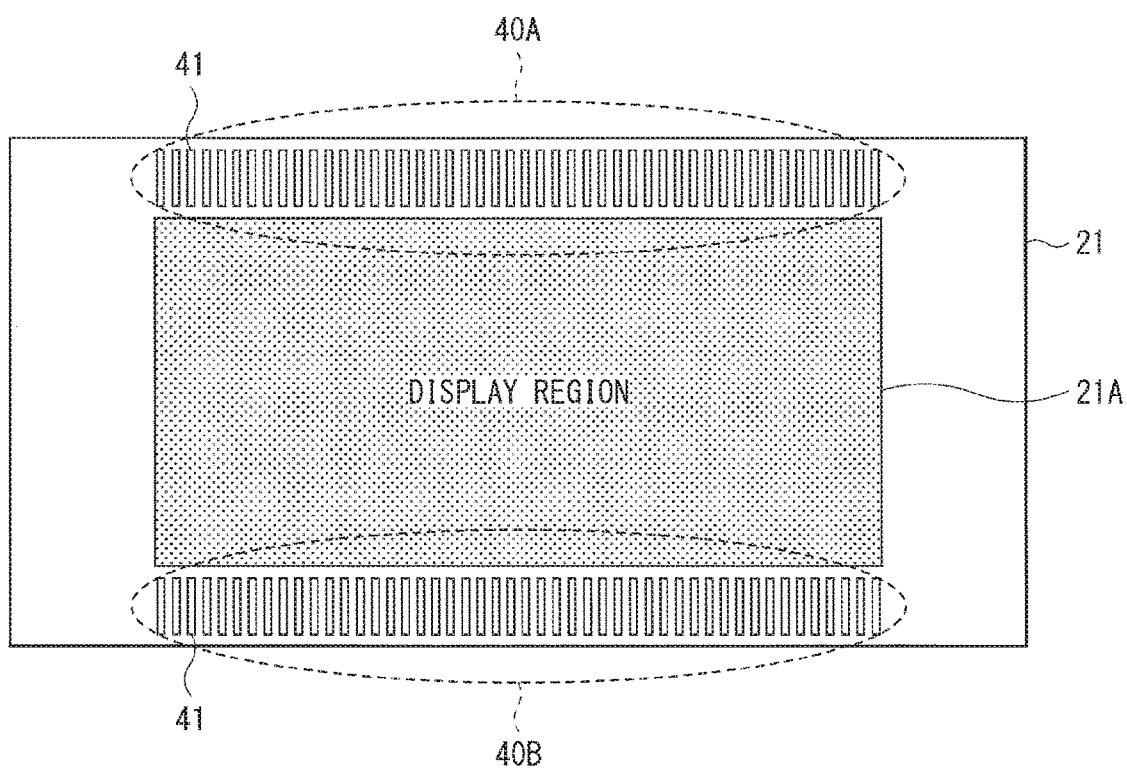

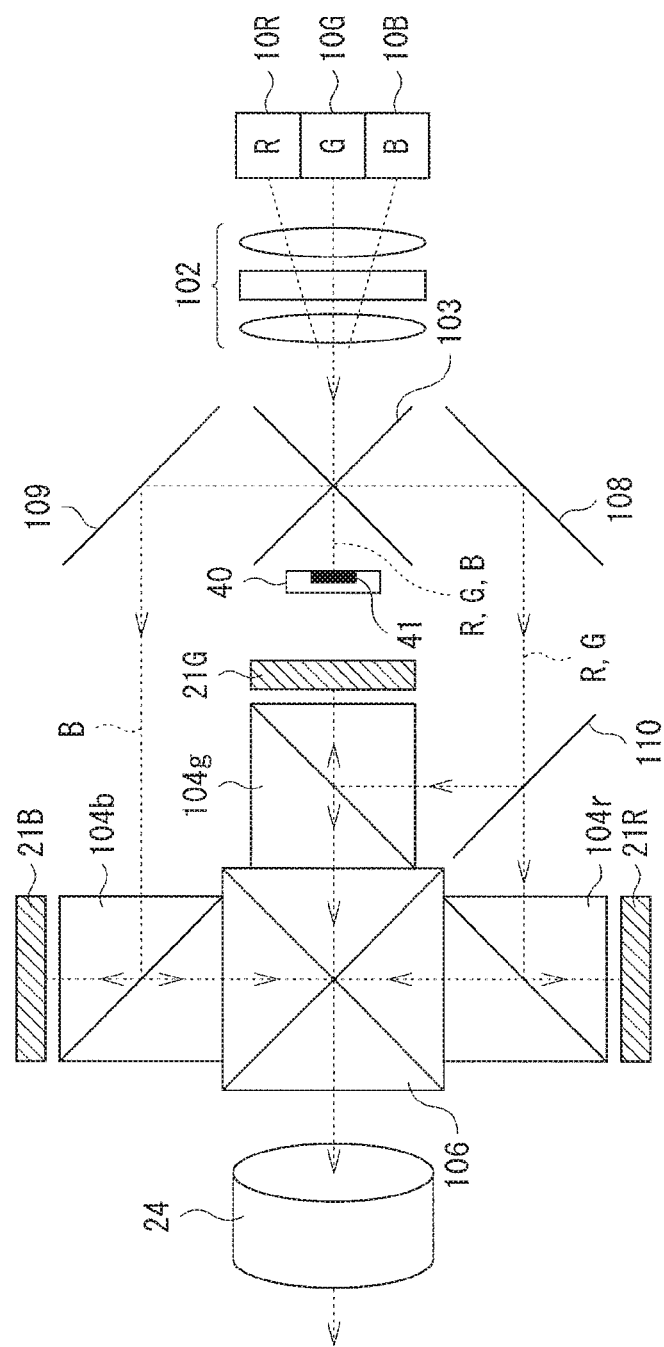
[FIG. 11]

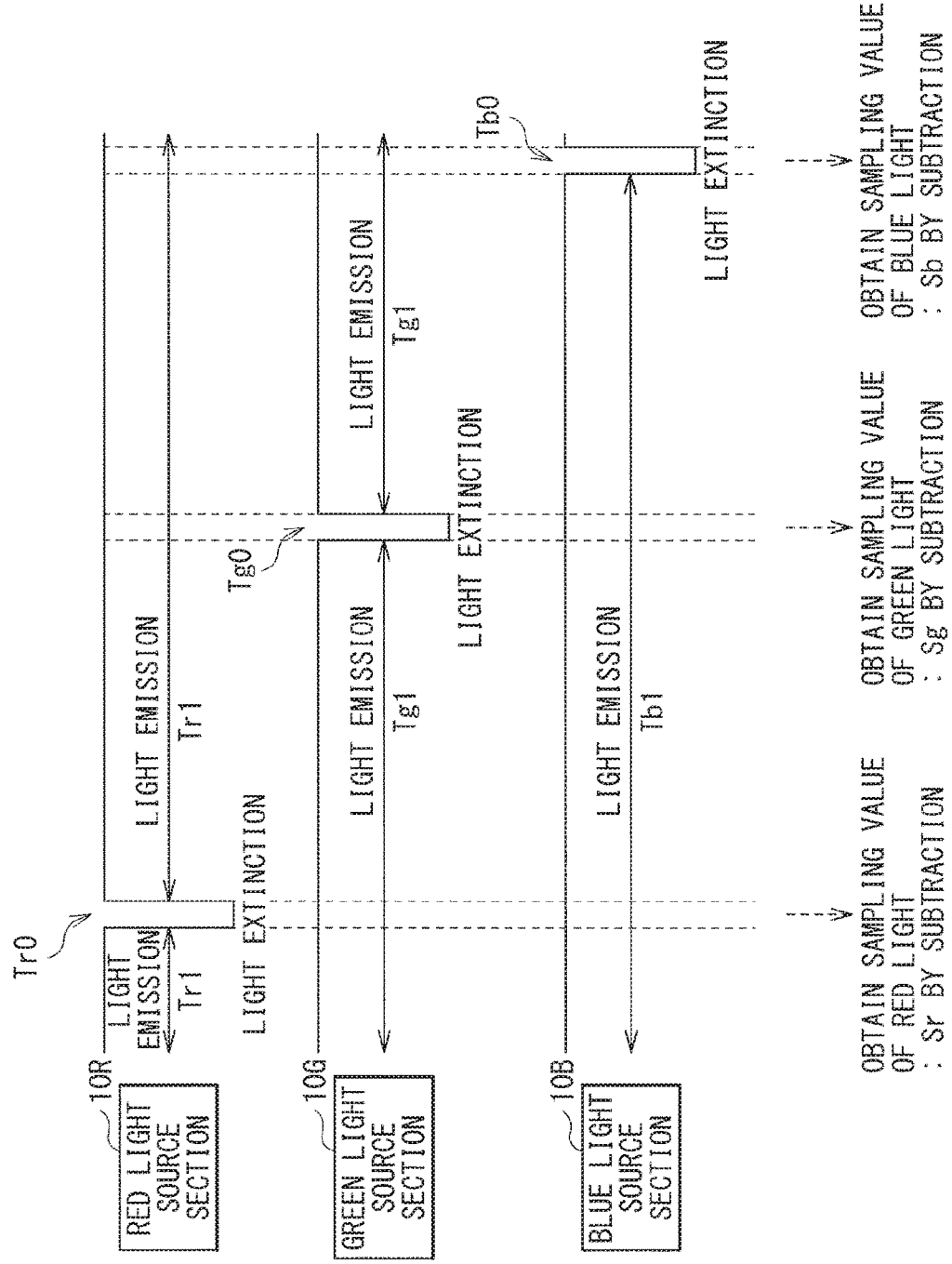

LIGHT SOURCE UNIT AND PROJECTION-TYPE DISPLAY

CROSS-REFERENCE TO RELATED APPLICATION

The present application is a continuation application of U.S. patent application Ser. No. 16/056,684, filed Aug. 7, 2018, which is a continuation application of U.S. patent application Ser. No. 15/525,452, filed May 9, 2017, which is a national stage entry of PCT/JP2015/077438, filed Sep. 29, 2015, and claims the benefit of priority from Japanese Patent Application No. JP 2014-237818, filed Nov. 25, 2014 which are hereby incorporated by reference in their entirety for all purposes.

TECHNICAL FIELD

The disclosure relates to a light source unit that emits rays of a plurality of colors, and a projection-type display that projects an image by using the rays from the light source unit.

BACKGROUND ART

In recent years, a projector (a projection-type display) that projects an image onto a screen has been widely used not only in offices but also at home. The projector generates image light by modulating light from a light source with a light valve (a spatial modulation device), and performs display by projecting the generated image light onto a screen.

CITATION LIST

Patent Literature

PTL 1: Japanese Unexamined Patent Application Publication No. 2012-104489 P 2011-96851A

SUMMARY OF THE INVENTION

An image projected from a projector is expected to be constant in white balance. When using light sources that emit rays of different wavelengths (e.g., red, green, and blue), it is necessary to maintain a ratio of a light quantity output of each of the light sources. To this end, feedback control of the light source is performed to control a light quantity output as appropriate by measuring a light quantity of the light source.

PTL 1 proposes classifying a plurality of semiconductor light-emission each serving as a light source into light-emission device groups for the respective colors, and detecting optical intensities for respective optical device groups with one light quantity detector, by causing the optical device groups to emit light sequentially in a time series. PTL 1 proposes performing feedback control of a driving current of the plurality of semiconductor light-emission devices, on the basis of a result of optical devices intensity sampling with the one light quantity detector. However, in the feedback control discussed in PTL 1, gain of the light quantity detector is not changed, when the optical intensity for each of the plurality of colors is detected with the one light quantity detector. It is therefore difficult to secure a sufficient dynamic range for each of the colors, which leads to a decrease in resolution of a sampling value, thereby making it difficult to perform precise feedback control of the light source. At worst, contrast of the light quantity of the light source periodically changes, which causes flicker.

In addition, the feedback control in PTL 1 is performed by classifying the plurality of semiconductor light-emission devices into the light-emission device groups of the respective colors, and collectively sampling light quantities for each of the optical device groups. However, the individual semiconductor light-emission devices are uneven. It is therefore difficult to perform precise feedback control, unless sampling is performed for each of the semiconductor light-emission devices even if the colors thereof are identical.

Hence, it is desirable to provide a light source unit and a projection-type display that make it possible to precisely measure a light quantity of each of a plurality of color rays with one light quantity detector.

A light source unit according to one embodiment of the disclosure includes: a plurality of light source sections that emit rays of colors different from each other; a light quantity detector that receives the rays of colors emitted by the plurality of light source sections in a spatially-common manner; and a controller that controls a light emission timing of each of the plurality of light source sections and a gain of the light quantity detector, and measures light quantities of the respective rays of colors at different timings and with different gains on the basis of a detection result of the light quantity detector.

A projection-type display according to one embodiment of the disclosure includes: a plurality of light source sections that emit rays of colors different from each other; at least one image display device that modulates the rays of colors emitted by the plurality of light source sections on the basis of an image signal, and outputs the modulated rays; a light quantity detector that receives the rays of colors in a spatially-common manner; and a controller that controls a light emission timing of each of the plurality of light source sections and a gain of the light quantity detector, and measures light quantities of the respective rays of colors at different timings and with different gains on the basis of a detection result of the light quantity detector.

In each of the light source unit and the projection-type display according to the respective embodiments of the disclosure, the light emission timing of each of the plurality of light source sections and the gain of the light quantity detector are controlled, and thereby, the light quantities of the respective rays of colors are measured at different timings and with different gains on the basis of the detection result of the light quantity detector.

Another light source unit according to one embodiment of the disclosure includes: a plurality of light source sections that emit rays of colors different from each other; a light quantity detector that receives the rays of colors emitted by the plurality of light source sections in a spatially-common manner; and a controller that controls a light emission timing of each of the plurality of light source sections, and measures light quantities of the respective rays of colors at different timings on the basis of a detection result of the light quantity detector, in which the controller causes the plurality of light source sections to emit the rays simultaneously, in a period except for a period in which the measurement of the light quantity of each of the rays of colors is performed, and extinguishes only one light source section that emits the ray of color to be measured among the plurality of light source sections for a predetermined period, in the period in which the measurement of the light quantity of each of the rays of colors is performed.

Another projection-type display according to one embodiment of the disclosure includes: a plurality of light source sections that emit rays of colors different from each other; a plurality of image display devices that modulate the respective rays of colors emitted by the plurality of light source sections, on the basis of an image signal, and output the respective modulated rays for the respective rays of colors; a light quantity detector that receives the rays of colors in a spatially-common manner; and a controller that controls a light emission timing of each of the plurality of light source sections, and measures light quantities of the respective rays of colors at different timings on the basis of a detection result of the light quantity detector, in which the controller causes the plurality of light source sections to emit the rays simultaneously, in a period except for a period in which the measurement of the light quantity of each of the rays of colors is performed, and extinguishes only one light source section that emits a ray of color to be measured among the plurality of light source sections for a predetermined period, in the period in which the measurement of the light quantity of each of the rays of colors is performed.

In each of the another light source unit and the another projection-type display according to the respective embodiments of the disclosure, the plurality of light source sections are caused to emit the rays simultaneously, in the period except for the period in which the measurement of the light quantity of each of the rays of colors is performed, and only one light source section that emits the ray of color to be measured among the plurality of light source sections is extinguished for the predetermined period, in the period in which the measurement of the light quantity of each of the rays of colors is performed.

According to each of the light source unit and the projection-type display according to the respective embodiments of the disclosure, the plurality of rays of colors are caused to be received by the light quantity detector in the spatially-common manner, and the light quantities of the respective plurality of rays of colors are measured at different timings and with different gains. It is therefore possible to measure the light quantities of the plurality of rays of colors precisely with the single light quantity detector.

According to each of the another light source unit and the another projection-type display according to the respective embodiments of the disclosure, the plurality of rays of colors are caused to be received by the light quantity detector in the spatially-common manner, and only one light source section that emits a ray of color to be measured is extinguished for the predetermined period among the plurality of light source sections. The light quantities of the respective rays of colors are thereby measured at different timings. It is therefore possible to measure the light quantities of the plurality of rays of colors precisely with the single light quantity detector.

It is to be noted that the effects described above are not necessarily limitative, and any of effects described in the disclosure may be provided.

BRIEF DESCRIPTION OF DRAWINGS

FIG. 1 is a configuration diagram illustrating an example of an overall configuration of a projection-type display according to a first embodiment of the disclosure.

FIG. 2 is a block diagram illustrating a configuration example of a control system in the projection-type display according to the first embodiment.

FIG. 3 is an explanatory diagram illustrating an example of each of light emission timings of light source sections and light-quantity sampling operation in the first embodiment.

FIG. 4 is a flowchart illustrating an example of the light-quantity sampling operation in the first embodiment.

FIG. 5 is an explanatory diagram illustrating an example of each of light emission timings of light source sections and light-quantity sampling operation in a second embodiment.

FIG. 6 is an explanatory diagram illustrating an example of each of light emission timings of light source sections and light-quantity sampling operation in a third embodiment.

FIG. 7 is an explanatory diagram illustrating an example of each of light emission timings of light source sections and light-quantity sampling operation in a modification example of the third embodiment.

FIG. 8 is an explanatory diagram illustrating an example of each of light emission timings of light source sections and light-quantity sampling operation in a fourth embodiment.

FIG. 9 is an explanatory diagram illustrating an example of each of light emission timings of light source sections and light-quantity sampling operation in a modification example of the fourth embodiment.

FIG. 10 is a configuration diagram illustrating an example of a light quantity detector in a fifth embodiment.

FIG. 11 is a configuration diagram illustrating an example of an overall configuration of a projection-type display according to a sixth embodiment.

FIG. 12 is an explanatory diagram illustrating an example of each of light emission timings of light source sections and light-quantity sampling operation in the sixth embodiment.

MODES FOR CARRYING OUT THE INVENTION

Some embodiments of the disclosure will be described below in detail in the following order, with reference to the drawings.
1. First Embodiment (an embodiment of a case where a plurality of light source sections that emit rays of colors different from each other are provided) (FIG. 1 to FIG. 4)
   1.1 Overall Configuration of Projection-Type Display
   1.2 Configuration and Operation of Control System
   1.2.1 Configuration Example of Control System
   1.2.2 Light Emission Timing of Light Source Section and Light-Quantity Sampling Operation
   1.3 Effects
2. Second Embodiment (an embodiment in which two light sources of same color are provided) (FIG. 5)
   2.1 Configuration and Operation
   2.2 Effects
3. Third Embodiment (an embodiment in which three or more light sources of same color are provided) (FIG. 6 and FIG. 7)
   3.1 Configuration and Operation
   3.2 Effects
   3.3 Modification Example
4. Fourth Embodiment (an embodiment in which sampling is performed a plurality of times for one light source) (FIG. 8 and FIG. 9)
   4.1 Configuration and Operation
   4.2 Effects
   4.3 Modification Examples
5. Fifth Embodiment (an embodiment in which a light-quantity detection device is disposed in an image display device) (FIG. 10)
   5.1 Configuration and Operation
6. Sixth Embodiment (an embodiment in which a plurality of image display devices are provided, and light sources having a plurality of colors sources are caused to emit rays simultaneously) (FIG. 11 and FIG. 12)

6.1 Configuration
6.2 Light Emission Timing of Light Source Section and Light-Quantity Sampling Operation
6.3 Effects
7. Other embodiments 1. First Embodiment

[1.1 Overall Configuration of Projection-Type Display]

FIG. 1 illustrates an example of an overall configuration of a projection-type display (a projector) according to a first embodiment of the disclosure.

This projection-type display includes an illuminator 1, an image display device 21, a field lens 22, a beam splitter 23, and a projection lens 24, as illustrated in FIG. 1. The illuminator 1 serves as a light source unit. The beam splitter 23 serves as a polarized-light separation device.

The illuminator 1 outputs illumination light L1 toward the beam splitter 23. The illuminator 1 has a light source section and a plurality of optical members for illumination. The optical members generate the illumination light L1 on the basis of light from the light source section, and guide the generated illumination light L1 to the image display device 21. As the light source section, there may be provided a plurality of light source sections that are disposed on different optical paths and emit rays of colors different from each other. The illuminator 1 also has an optical-path synthesis device that synthesizes optical paths of two or more light sources among the plurality of light source sections.

To be more specific, the illuminator 1 has a blue light source section 10B a green light source section 10G, and a red light source section 10R, as the plurality of light source sections. For example, the blue light source section 10B, the green light source section 10G, and the red light source section 10R each include a laser light source. The blue light source section 10B includes a blue laser 11B that may emit, for example, blue light with a wavelength of about 450 nm, as a light source. The green light source section 10G includes a green laser 11G that may emit, for example, green light with a wavelength of about 520 nm, as a light source. The red light source section 10R includes a red laser 11R that may emit, for example, a red light with a wavelength of about 640 nm, as a light source.

The illuminator 1 further has a first coupling lens 12B, a second coupling lens 12G, a third coupling lens 12R, a drive optical device 14, a first dichroic prism 131, a second dichroic prism 132, a first condensing lens 141, a second condensing lens 142, and a fly-eye lens 150, as the plurality of optical members for illumination.

The illuminator 1 further has a light quantity detector 40, a fourth coupling lens 42, and a polarizing device 43. The light quantity detector 40 includes a light-quantity detection device 41. The light-quantity detection device 41 may be configured of, for example, a photodiode.

The second coupling lens 12G is a lens (a coupling lens) that collimates the green light outputted from the green laser 11G to couple the collimated light (parallel light) to the first dichroic prism 131. Similarly, the first coupling lens 12B is a lens (a coupling lens) that collimates the blue light outputted from the blue laser 11B to couple the collimated light to the first dichroic prism 131. Further, the third coupling lens 12R is a lens (a coupling lens) that collimates the red light outputted from the red laser 11R to couple the collimated light to the second dichroic prism 132. It may be preferable that these coupling lenses 12R, 12G, and 12B collimate (to form parallel light of) the respective entering laser beams.

The first dichroic prism 131 and the second dichroic prism 132 are each an optical-path synthesis device that synthesizes optical paths of two or more light sources. The first dichroic prism 131 is a prism that selectively reflects the green light entering through the second coupling lens 12G, while selectively allowing the blue light entering through the first coupling lens 12B to pass therethrough. The second dichroic prism 132 is a prism that selectively reflects most of the red light entering through the third coupling lens 12R, while selectively allowing most of the blue light and the green light outputted from the first dichroic prism 131. Color synthesis (optical-path synthesis) for the red light, the green light, and the blue light is thereby performed.

Further, the second dichroic prism 132 selectively reflects a portion of the red light entering through the third coupling lens 12R, toward the light quantity detector 40, while selectively reflecting a portion of the blue light and the green light outputted from the first dichroic prism 131, toward the light quantity detector 40. The blue light, the green light, and the red light emitted from the plurality of light source sections 10B, 10G, and 10R thereby enter the light-quantity detection device 41 of the light quantity detector 40 through the polarizing device 43 and the fourth coupling lens 42 in a spatially-common manner.

The drive optical device 14 is an optical device provided to reduce speckle noise and interference fringes in the illumination light L1. The drive optical device 14 is disposed on an optical path between the first condensing lens 141 and the second dichroic prism 132. For example, the drive optical device 14 may be allowed to reduce the speckle noise and the interference fringes in the illumination light L1, by changing a state of a bundle of passing rays by causing micro vibration in a direction along an optical axis or in a direction perpendicular to the optical axis.

The fly-eye lens 150 is an optical member (an integrator) in which a plurality of lenses are two-dimensionally arranged on a substrate. The fly-eye lens 150 spatially divides a bundle of entering rays according to an array of the plurality of lenses, and outputs light obtained thereby. The fly-eye lens 150 is disposed on an optical path between the first condensing lens 141 and the second condensing lens 142. The fly-eye lens 150 makes in-plane light quantity distribution of the illumination light L1 uniform.

The second condensing lens 142 is a lens provided to condense the light outputted from the fly-eye lens 150, and to output the condensed light toward the beam splitter 23 as the illumination light L1.

The beam splitter 23 is a polarized-light separation device that separates the entering light into a first polarized component (e.g., S-polarized component) and a second polarized component (e.g., P-polarized component), and outputs these polarized components in different directions. The beam splitter 23 selectively reflects a specific first polarized component, while selectively allowing a specific second polarized component to pass therethrough. For example, the beam splitter 23 may reflect much of the first polarized component included in the entering illumination light L1, while allowing much of the second polarized component to pass therethrough.

For example, the image display device 21 may be a reflection-type liquid crystal device such as a liquid crystal on silicon (LCOS). For example, the image display device 21 may modulate the first polarized component included in the illumination light L1 entering through the field lens 22 and the beam splitter 23, on the basis of image data. The image display device 21 may also output the modulated light through the field lens 22 and the beam splitter 23. The image display device 21 may output, for example, the second polarized component, whose polarization state is turned from an entering state, as the modulated light. It is to be noted that, in the image display device 21, it is possible to perform black display by returning the entering first polarized component to the beam splitter 23 while maintaining a polarization state thereof as is.

The projection lens 24 projects the modulated light entering from the image display device 21 through the beam splitter 23, onto a projection plane of a screen 30. The projection lens 24 is a projection optical system provided to project an image.

[1.2 Configuration and Operation of Control System]
(1.2.1 Configuration Example of Control System)

FIG. 2 illustrates a configuration example of a control system of a projection-type display. This projection-type display includes a main controller 90, an image-display-device control circuit 91, and a light source driver 92, as the control system. The main controller 90 includes a central processing unit (CPU).

The image-display-device control circuit 91 controls the image display device 21, on the basis of an inputted image signal. Further, the image-display-device control circuit 91 outputs a pulse-like light emission timing signal based on the inputted image signal, to the main controller 90.

The main controller 90 controls light emission timings of the plurality of light source sections 10B, 10G, and 10R through the light source driver 92, in such a manner that the plurality of light source sections 10B, 10G, and 10R each emit light at an appropriate timing, on the basis of a light emission timing signal. In particular, in the present embodiment, the main controller 90 controls the plurality of light source sections 10B, 10G, and 10R in such a manner that light emission periods of the respective color rays temporally vary, as will be described later.

Further, the main controller 90 performs feedback control of a light quantity of the color ray emitted by each of the plurality of light source sections 10B, 10G, and 10R, through the light source driver 92, on the basis of a detection result of the light quantity detector 40. In particular, in the present embodiment, the main controller 90 performs the feedback control of the light quantity, by controlling light emission timings of the plurality of light source sections 10B, 10G, and 10R and a gain of the light quantity detector 40, and measuring light quantities of the respective plurality of color rays at different timings and with different gains, on the basis of the detection result of the light quantity detector 40, as will be described later.

The light source driver 92 sets a current value of a driving current of each of the laser light sources, so as to bring a light quantity of light emitted by the laser light source in each of the plurality of light source sections 10B, 10G, and 10R, closer to a target light quantity value specified by the main controller 90. The light source driver 92 may have, for example, a drive transistor provided to control on (light emission) and off (light extinction) of each of the laser light sources. For example, it is possible to perform pulsed control of on (light emission) and off (light extinction) of each of the laser light sources in synchronization with the light emission timing signal, by inputting the above-described pulse-like light emission timing signal as a gate signal of the drive transistor.

(1.2.2 Light Emission Timing of Light Source Section and Light-Quantity Sampling Operation)

FIG. 3 illustrates an example of each of light emission timings of the plurality of light source sections 10B, 10G, and 10R, and light-quantity sampling operation in the light quantity detector 40, in the present embodiment.

It is to be noted that FIG. 3 illustrates a light emission timing signal of the red light, a light emission timing signal of the green light, and a light emission timing signal of the blue light, in order from top. A horizontal axis indicates time, and a vertical axis indicates a signal value, of the light emission timing signal in FIG. 3. Periods in which the light emission timing signals of the respective color rays are high are light emission periods Tr1, Tg1, and Tb1 of the respective color rays, and periods in which the light emission timing signals of the respective color rays are low are light extinguished periods Tr0, Tg0, and Tb0 of the respective color rays.

Further, a lowermost part of FIG. 3 illustrates a set value of a gain of the light quantity detector 40, in which a vertical axis indicates the time, and a horizontal axis indicates a gain value. Gab indicates a gain value for the blue light, Gag indicates a gain value for the green light, and Gar indicates a gain value for the red light. Sb indicates a detection value (a sampling value) of a light quantity of the blue light, Sg indicates a sampling value of a light quantity of the green light, and Sr indicates a sampling value of a light quantity of the red light, obtained by the light quantity detector 40.

The laser light sources of the respective light source sections 10B, 10G, and 10R emit rays at timings according to the light emission timing signals of the blue light, the green light, and the red light, as illustrated in FIG. 3. Each of the laser light sources also emits a ray with a current value set by the light source driver 92. The light quantity of each of the laser light sources is converted into a voltage value by the light-quantity detection device 41 of the light quantity detector 40. The voltage value is subjected to AD conversion by the main controller 90, and fed back to the light emission quantity of each of the laser light sources at and after the next light emission timing.

Meanwhile, most light not allocated to the light quantity detector 40 enters the image display device 21. In the image display device 21, a reflectance of each pixel of each of the colors is set by the image-display-device control circuit 91, at a timing matching with the light emission timing of each of the colors, according to the image signal. Image information of each of the colors is projected onto the screen 30 by the image display device 21 in a time series, and thereby an image is displayed on the screen 30.

The main controller 90 sets the gain value Gar for the red light as the gain value of the light quantity detector 40, at a timing when the light emission timing signal of the red light becomes high, as illustrated in FIG. 3. The gain value Gar for the red light is set in such a manner that a value which the sampling value Sr of the red light may take in the light quantity detector 40 sufficiently falls within a detection range in the light quantity detector 40. The main controller 90 then acquires a detection value of the red light generated by the light quantity detector 40.

Similarly, the main controller 90 sets the gain value Gag for the green light as the gain value of the light quantity detector 40, at a timing when the light emission timing signal of the green light becomes high. The gain value Gag for the green light is set in such a manner that a value which the sampling value Sg of the green light may take in the light quantity detector 40 sufficiently falls within the detection range in the light quantity detector 40. The main controller 90 then acquires a detection value of the green light generated by the light quantity detector 40. Similar operation is performed for the blue light. Afterward, these operations are repeated each time the light emission timing signal changes.

This optimizes the gain in such a manner the light quantity of the red light becomes a maximum value falling within the detection range of the light quantity detector 40, in a period in which the light emission timing signal of the red light is high and the light quantity of the red light is sampled. This makes it possible to obtain the light quantity value of the red light with sufficient resolution. This is applicable to the green light and the blue light.

FIG. 4 illustrates an example of a flow of the light-quantity sampling operation described above.

First, the main controller 90 determines whether it is the light emission period Tr1 of the red light, on the basis of the light emission timing signal (step S11). When it is not the light emission period Tr1 of the red light (N in step S11), the operation proceeds to step S13. When it is the light emission period Tr1 of the red light (Y in step S11), the main controller 90 sets the gain value Gar optimal for the red light as the gain of the light quantity detector 40 (step S12), and then proceeds to step S13.

In step S13, the main controller 90 determines whether it is the light emission period Tg1 of the green light, on the basis of the light emission timing signal (step S13). When it is not the light emission period Tg1 of the green light (N in step S13), the operation proceeds to step S15. When it is the light emission period Tg1 of the green light (Y in step S13), the main controller 90 sets the gain value Gag optimal for the green light as the gain of the light quantity detector 40 (step S14), and then proceeds to step S15.

In step S15, the main controller 90 determines whether it is the light emission period Tb1 of the blue light, on the basis of the light emission timing signal (step S15). When it is not the light emission period Tb1 of the blue light (N in step S15), the operation returns to step S11. When it is the light emission period Tb1 of the blue light (Y in step S15), the main controller 90 sets the gain value Gab optimal for the blue light as the gain of the light quantity detector 40 (step S16), and then returns to step S11.

[1.3 Effects]

As described above, according to the present embodiment, the plurality of color rays are allowed to enter the light quantity detector 40 in a spatially-common manner, and the light quantities of the respective color rays are measured at different timings with different gains. This allows the one light quantity detector 40 to measure the light quantity of each of the plurality of color rays precisely. According to the present embodiment, the gain optimal for each of the colors is set, which makes it possible to use a dynamic range of the light quantity detector 40 sufficiently. It is therefore possible to obtain a sampling value of sufficient resolution. This makes it possible to perform precise power control of the light source, and suppress occurrence of a flicker phenomenon to be caused by the light source.

(Advantage of Changing Gain for Each Color)

An advantage of changing the gain for each of the colors is specifically as follows. For example, when the wavelength of the red light is 780 nm, the wavelength of the green light is 650 nm, and the wavelength of the blue light is 405 nm, sensitivity of the light-quantity detection device 41 for the same light quantity may be, for example, R:G:B=7.15:7.52: 4.70, as a typical value. In this case, a difference between the green with the largest value and the blue with the smallest value is 1.6 times. It is therefore necessary to adjust the sensitivity to the blue light when the gain is not changed, and resolution of the blue light results in 1/1.6. In other words, only a gain that is 1.6 times rougher than that of the green light is settable for the blue light.

It is to be noted that the effect described in the specification is a mere example without being limitative, and other effect may be produced. This is also applicable to the following other embodiments.

2. Second Embodiment

Next, a second embodiment of the disclosure will be described. In the following, description of a part similar to the first embodiment in terms of configuration and action will be omitted as appropriate.

[2.1 Configuration and Operation]

In the first embodiment, the description is provided using the example in which each of the plurality of light source sections 10B, 10G, and 10R has one laser light source. However, at least one predetermined light source section among the plurality of light source sections 10B, 10G, and 10R may have a plurality of light sources that emit predetermined color light of the same color. Further, light quantities of the rays of the respective plurality of light sources may be measured at timings different from each other, by extinguishing at least one light source among the plurality of light sources for a predetermined period, in a light emission period of the predetermined color light in the predetermined light source section.

In the present embodiment, there will be described an example case where the red light source section 10R is provided as the predetermined light source section, and the red light source section 10R has two laser light sources (a first red laser 11R1 and a second red laser 11R2) that emit the red light as the predetermined color light.

It is to be noted that, in the present embodiment, an overall configuration of a projection-type display (a projector) and a configuration of a control system may be substantially similar to those illustrated in FIG. 1 and FIG. 2, except for the configuration of the red light source section 10R.

FIG. 5 illustrates an example of each of light emission timings of the light source section 10R, and light-quantity sampling operation in the light quantity detector 40, in the present embodiment.

It is to be noted that FIG. 5 illustrates a light emission timing signal of the red light of the light source section 10R as a whole, a light emission timing signal of the first red laser 11R1 in the red light source section 10R, and a light emission timing signal of the second red laser 11R2 in the red light source section 10R, in order from top. A horizontal axis indicates time, and a vertical axis indicates a signal value, of the light emission timing signal in FIG. 5. A period in which the light emission timing signal is high is each of light emission periods Tr11 and Tr12, and a period in which the light emission timing signal is low is a light extinguished period Tr0. Sr1 indicates a sampling value of a light quantity of the first red laser 11R1, and Sr2 indicates a sampling value of a light quantity of the second red laser 11R2.

It is conceivable that, when the red light source section 10R has the two laser light sources, feedback control may be performed in such a manner that the light quantity detector 40 obtains a value representing a total of light quantities of the two laser light sources, and a value determined by dividing the obtained value by 2 may be fed back as a sampling value of each of the light quantities of the two laser light sources. However, even if the two laser light sources are of the same color, same light quantities may not be necessarily obtained because of, for example, variety of individuals, even when driving currents of the same current value are supplied to the two laser light sources. It is therefore hardly conceivable that the sampling values of the light quantities of the two laser light sources may also become identical. To set an appropriate current value for each of the laser light sources, a sampling value of a light quantity of each of the two laser light sources is necessary.

For this reason, in the present embodiment, the light quantities of rays emitted by the two laser light sources are measured at the timings different from each other, by extinguishing one of the two laser light sources for a predetermined period, in the light emission periods Tr11 and Tr12 as a whole of the red light source section 10R, as illustrated in FIG. 5. In the example in FIG. 5, the sampling value Sr2 of the light quantity of the second red laser 11R2 is obtained by extinguishing the first red laser 11R1 for a predetermined period, in the first light emission period Tr11 of the red light. Subsequently, the sampling value Sr1 of the light quantity of the first red laser 11R1 is obtained by extinguishing the second red laser 11R2 for a predetermined period, in the second light emission period Tr12 of the red light.

It is to be noted that, when the time during which the laser light source is extinguished for sampling is 1000 µs or more, on/off operation of the laser light source is visible, which leads to a flicker phenomenon. To prevent this, the time during which the laser light source is extinguished for sampling may be preferably 1000 µs or less.

In addition, in the above description, the red light source section 10R is taken as an example. However, it is possible to perform similar control in a case where the blue light source section 10B and the green light source section 10G each have a plurality of light sources.

[2.2 Effects]

According to the present embodiment, it is possible to obtain a sampling value for each individual even if a plurality of light sources of the same color are present. It is therefore possible to perform precise feedback control for each of the light sources.

(Advantage of Separately Obtaining Sampling Values of Light Sources of Same Color)

Advantages of separately obtaining sampling values of the plurality of light sources of the same color are specifically as follows.

(1) Assume that there are two light sources of the same color, and light quantities of the respective light sources when a certain current value is fed are A and B. In this case, a light quantity when collectively obtained is A+B, and a current value is set for each of the light sources as a light quantity of (A+B)/2. However, if IL properties of the respective light sources are different, actual light quantities in the respective light sources are different even if the same current value is set. One with a larger light quantity emits light beyond an upper limit, and thus may be broken early.

(2) When there are two light sources of the same color, and one of the light sources is broken, the light quantity as a whole is halved. However, when the light quantities are simultaneously obtained, it may be misunderstood that each of the light quantities of both of the light sources is halved. In this case, light may be emitted until a limit current value is reached, and thereby the other light source which is not broken may be broken. If the sampling values are separately obtained, the light quantity of each of the two light sources is recognized, and therefore, the above-described incident does not occur. In addition, it is possible to reduce power consumption, by adding processing of stopping the light emission of the broken one.

(3) In the projector in which the plurality of light sources of the same color are disposed, it is not necessary to make projection ranges of the respective light sources equal if light quantities of the respective light sources are equal. It is possible to provide such a design that each of the light sources is in charge of a corresponding projection range. However, such a design is not acceptable if the light quantities of the respective light sources are not equal. In other words, luminance unevenness appears in a projection range, which renders this projector useless as a projector.

According to the present embodiment, it is possible to make the light quantities of the respective light sources equal by separately obtaining the sampling values of the light sources of the same color. It is therefore possible to achieve the above-described design flexibility.

3. Third Embodiment

Next, a third embodiment of the disclosure will be described. In the following, description of a part similar to the first embodiment or the second embodiment in terms of configuration and action will be omitted as appropriate.

[3.1 Configuration and Operation]

In the second embodiment, the example case where the two light sources of the same color are provided in the one light source section is described. However, in the present embodiment, an example case where three or more light sources of the same color are provided in one light source section will be described. The main controller 90 may calculate a light quantity of light emitted by specific one light source, on the basis of a difference between a detection result of the light quantity detector 40 in a case where all of the plurality of light sources emit light and a detection result of the light quantity detector 40 in a case where the specific one light source among the plurality of light sources is extinguished.

In the present embodiment, there will be described an example case where the red light source section 10R is provided as the predetermined light source section, and the red light source section 10R has three laser light sources (the first red laser 11R1, the second red laser 11R2, and a third red laser 11R3) that emit the red light as the predetermined color light.

It is to be noted that, in the present embodiment, an overall configuration of a projection-type display (a projector) and a configuration of a control system may be substantially similar to those illustrated in FIG. 1 and FIG. 2, except for the configuration of the red light source section 10R.

FIG. 6 illustrates an example of each of light emission timings of the light source section 10R, and light-quantity sampling operation in the light quantity detector 40, in the present embodiment.

It is to be noted that FIG. 6 illustrates a light emission timing signal of the red light of the light source section 10R as a whole, a light emission timing signal of the first red laser 11R1 in the red light source section 10R, a light emission timing signal of the second red laser 11R2 in the red light source section 10R, and a light emission timing signal of the third red laser 11R3 in the red light source section 10R, in order from top. A horizontal axis indicates time, and a vertical axis indicates a signal value, of the light emission timing signal in FIG. 6. A period in which the light emission timing signal is high is each of light emission periods Tr11 and Tr12, and a period in which the light emission timing signal is low is a light extinguished period Tr0. Sr1 indicates a sampling value of a light quantity of the first red laser 11R1, and Sr2 indicates a sampling value of a light quantity of the second red laser 11R2.

When the three or more laser light sources of the same color are present, one laser light source among the three laser light sources is extinguished for a predetermined period, in the light emission periods Tr11 and Tr12 of the red light source section 10R as a whole, as illustrated in FIG. 6. Further, a sampling value of a light quantity obtained at this time is subtracted from a sampling value of a light quantity when all the three laser light sources emit light. This makes it possible to calculate a sampling value of a light quantity of the extinguished one laser light source.

In the example in FIG. 6, the first red laser 11R1 is extinguished for the predetermined period, in the first light emission period Tr11 of the red light. Further, the sampling value of the light quantity obtained when the first red laser 11R1 is extinguished is subtracted from the sampling value of the light quantity obtained when all the three laser light sources emit light in the first light emission period Tr11. The sampling value Sr1 of the light quantity of the first red laser 11R1 is thereby calculated.

Subsequently, the second red laser 11R2 is extinguished for the predetermined period, in the second light emission period Tr12 of the red light. Further, the sampling value of the light quantity obtained when the second red laser 11R2 is extinguished is subtracted from the sampling value of the light quantity obtained when all the three laser light sources emit light in the second light emission period Tr12. The sampling value Sr2 of the light quantity of the second red laser 11R2 is thereby calculated.

It is to be noted that the period during which the laser light source is extinguished for sampling may be preferably 1000 µs or less, as with the second embodiment.

In addition, in the above description, the red light source section 10R is described as an example. However, it is possible to perform similar control when the blue light source section 10B and the green light source section 10G each have three or more light sources.

[3.2 Effects]

According to the present embodiment, it is possible to minimize the number of laser light sources to be extinguished for sampling of a light quantity. If only one laser light source is extinguished when the sampling value of the light quantity of each of three or more laser light sources is obtained, it is possible to obtain the sampling value of the light quantity of the one laser light source. It is therefore possible to minimize a decline in light quantity in a case where the laser light source is extinguished in sampling.

[3.3 Modification Example]

It is to be noted that, for more accurate sampling, only a laser light source targeted for sampling of a light quantity may be caused to emit light, and all other laser light sources may be extinguished. FIG. 7 illustrates an example of each of light emission timing of the light source section 10R, and light-quantity sampling operation in the light quantity detector 40, when such light emission control is performed.

In the example in FIG. 7, the first red laser 11R1 and the second red laser 11R2 are extinguished for a predetermined period, in the first light emission period Tr11 of the red light. The sampling value Sr2 of the light quantity of the second red laser 11R2 is thereby obtained directly.

Subsequently, the second red laser 11R2 and the third red laser 11R3 are extinguished for a predetermined period, in the second light emission period Tr12 of the red light. The sampling value Sr1 of the light quantity of the first red laser 11R1 is thereby obtained directly.

4. Fourth Embodiment

Next, a fourth embodiment of the disclosure will be described. In the following, description of a part similar to the first embodiment to the third embodiment in terms of configuration and action will be omitted as appropriate.

[4.1 Configuration and Operation]

In the second and third embodiments, there is described the example in which the plurality of light sources of the same color are provided in one light source section, and the light quantity of each of the light sources is measured once within one light emission period. However, the light quantity of each of the light sources may be measured a plurality of times over a plurality of light emission periods. In the present embodiment, the main controller 90 extinguishes at least one light source among a plurality of light sources for a predetermined period, in each of a plurality of light emission periods of predetermined color light in a predetermined light source section. A light quantity of light emitted by each of the plurality of light sources is thereby measured a plurality of times at different timings over a plurality of light emission periods.

It is to be noted that, in the present embodiment, an overall configuration of a projection-type display (a projector) and a configuration of a control system may be substantially similar to those illustrated in FIG. 1 and FIG. 2, except for the configuration of the red light source section 10R.

In the second and third embodiments, only a value in a case where alight quantity sampling segment is a certain moment within one light emission period of a certain color is obtained. However, in a laser light source, sampling values may involve variations due to a phenomenon called a mode-hop. It is conceivable that when a sampled value takes a value at this phenomenon by chance, a flicker phenomenon may occur if feedback is performed on the basis of such a value. However, if sampling is performed a plurality of times within one light emission period, the number of times the laser light source is extinguished in a short period may increase, which may cause a change in light quantity in a short period, leading to a flicker phenomenon. Alternatively, if the number of times the laser light source is extinguished for sampling is large, an overall light quantity may decrease, which may decrease performance of brightness of a projector. To address such an issue, sampling may be performed a plurality of times for one laser light source over a plurality of light emission periods (a plurality of frames).

FIG. 8 illustrates an example of each of light emission timings of the red light source section 10R, and light-quantity sampling operation in the light quantity detector 40, in the present embodiment. In FIG. 8, there will be described an example case where the red light source section 10R is provided as the predetermined light source section, and the red light source section 10R has two laser light sources (the first red laser 11R1 and the second red laser 11R2) that emit the red light, as with the second embodiment.

In the example in FIG. 8, in the first light emission period Tr11 of the red light, the first red laser 11R1 is extinguished for a predetermined period, and a first sampling value A of a light quantity of the second red laser 11R2 is thereby obtained. Subsequently, in the second light emission period Tr12 of the red light, the first red laser 11R1 is extinguished for a predetermined period, and a second sampling value B of a light quantity of the second red laser 11R2 is thereby obtained. It is possible to calculate the sampling value Sr2 of the light quantity of the second red laser 11R2, with (A+B)/2.

In this way, one laser light source is extinguished over a plurality of light emission periods, and a sum of the sampled values is divided by the number of sampling times. This makes it possible to average the sampling values of the plurality of light emission periods. The number of sampling times is two in the example in FIG. 8, but may be any number of two or more.

It is to be noted that the period during which the laser light source is extinguished for sampling may be preferably 1000 μs or less, as with the second embodiment.

In addition, in the above description, the red light source section 10R is described as an example. However, it is possible to perform similar control when the blue light source section 10B and the green light source section 10G each have a plurality of light sources.

[4.2 Effects]

According to the present embodiment, it is possible to minimize the light quantity that decreases due to extinguishing of the light source in sampling, by sampling the light quantity over the plurality of light emission periods (the plurality of frames).

[4.3 Modification Examples]

In the operation examples illustrated in FIG. 5 to FIG. 8, the light quantity within one light emission period (one frame) is sampled only by performing sampling for any one of the laser light sources. However, sampling for a plurality of laser light sources of the same color may be performed within the same frame, if sampling timings do not overlap. Further, sampling may be performed a plurality of times for the same laser light source within one light emission period.

Furthermore, there may be adopted a mechanism in which a technique of performing sampling over a plurality of frames, a technique of performing sampling a plurality of times within one frame, and a technique of performing sampling for different laser light sources are mixed to attain the specified number of sampling times.

In addition, when sampling is performed over a plurality of frames, it is not necessary to wait for sampling operation of other laser light sources (for example, the second red laser 11R2 or the third red laser 11R3) until the end of the number of sampling times for certain one laser light source (for example, the first red laser 11R1). Sampling may be performed for each of the laser light sources alternately. Moreover, the time to perform sampling for each of the laser light sources may not be predetermined, and sampling data may be obtained in a temporally irregular manner.

Meanwhile, values of light quantities may involve variations even within the same light emission period, due to a heat sag or a mode-hop in the laser light source. For this reason, it is also effective to obtain a value by temporally shifting a sampling position, when sampling is performed over a plural frames, as illustrated in FIG. 9. The number of times is three in the example in FIG. 9. However, the number of times may be any number of two or more. In this case as well, as described above, a technique of performing sampling over a plurality of frames, a technique of performing sampling a plurality of times within the same frame, and a technique of performing sampling for other laser light source may be mixed. In other words, various techniques may be freely mixed.

In the example in FIG. 9, in the first light emission period Tr11 of the red light, the first red laser 11R1 is extinguished for a predetermined period, and a first sampling value A of a light quantity of the second red laser 11R2 is thereby obtained. Subsequently, in the second light emission period Tr12 of the red light, the first red laser 11R1 is extinguished for a predetermined period, and a second sampling value B of a light quantity of the second red laser 11R2 is thereby obtained. Subsequently, in a second light emission period Tr13 of the red light, the first red laser 11R1 is extinguished for a predetermined period, and a third sampling value C of a light quantity of the second red laser 11R2 is thereby obtained. In addition, in each of the first to third light emission periods, timings for extinguishing the first red laser 11R1 are different. It is possible to calculate the sampling value Sr2 of the light quantity of the second red laser 11R2, with (A+B+C)/3.

In this way, when sampling is performed over a plurality of light emission periods, the timing of performing sampling within each of the light emission periods is varied, so that it is possible to obtain a sampling value within each of the light emission periods in a temporally-balanced manner.

5. Fifth Embodiment

Next, a fifth embodiment of the disclosure will be described. In the following, description of a part similar to the first embodiment to the fourth embodiment in terms of configuration and action will be omitted as appropriate.

[5.1 Configuration and Operation]

In the configuration example illustrated in FIG. 1, the example in which the light quantity detector 40 including the light-quantity detection device 41 is disposed in the illuminator 1 is described. However, the light quantity detector 40 may be configured of a plurality of light-quantity detection devices 41 embedded in the image display device 21, as illustrated in, for example, FIG. 10. The light-quantity detection device 41 may be a photo diode (PD).

In other words, without being disposed at a position close to the light source as illustrated in FIG. 1, the light quantity detector 40 may be configured in such a manner that the plurality of light-quantity detection devices 41 are embedded in upper and lower regions (a first detection region 40A and a second detection region 40B) outside a display region 21A of the image display device 21, as illustrated in, for example, FIG. 10. A design is provided beforehand to irradiate the first detection region 40A and the second detection region 40B as well with light from the light source.

In such a configuration as well, it is possible to change the gain of the light quantity detector 40 for each of the color rays. For example, it is possible to control the gain, with the number of the light-quantity detection devices 41 to be used for light quantity detection. For example, it is possible to obtain effects similar to those in a case in which the gain is a half if the number of the light-quantity detection devices 41 to be used for light quantity detection is a half, and a case in which the gain is a quarter if the number of the light-quantity detection devices 41 to be used for light quantity detection is a quarter.

In addition, for example, assume that the light-quantity detection devices 41 are numbered 1, 2, 3, 4, 5, ... from left, to eliminate an influence of in-plane light quantity unevenness when the number is decreased. In this case, only the light-quantity detection devices 41 numbered 1, 3, 5, 7, 9, ... are used to decrease the number to a half, whereas only the light-quantity detection devices 41 numbered 1, 5, 9, ... are used to decrease the number to a quarter. This makes it difficult to receive the influence of the in-plane light quantity unevenness

6. Sixth Embodiment

Next, a sixth embodiment of the disclosure will be described. In the following, description of a part similar to the first embodiment to the fifth embodiment in terms of configuration and action will be omitted as appropriate.

[6.1 Configuration]

FIG. 11 illustrates an example of an overall configuration of a projection-type display according to the sixth embodiment of the disclosure. This projection-type display includes the projection lens 24, a lens section 102, a dichroic color separation filter 103, a beam splitter 104b, a beam splitter 104g, a beam splitter 104r, a dichroic prism 106, a total reflection mirror 108, and a total reflection mirror 109.

This projection-type display also includes three image display devices of an image display device 21B for blue, an image display device 21G for green, and an image display device 21R for red, in place of the one image display device 21 in FIG. 1.

In the configuration example in FIG. 1, the plurality of light source sections 10B, 10G, and 10R disposed on the different optical paths and the one image display device 21 are provided, and the plurality of light source sections 10B, 10G, and 10R apply the respective color rays at different timings to the one image display device 21. In contrast, in the configuration example in FIG. 11, the plurality of light source sections 10B, 10G, and 10R are integrally disposed on the same optical path, and the plurality of light source sections 10B, 10G, and 10R simultaneously emit rays when an image is displayed. The corresponding color ray is emitted to each of the image display devices 21B, 21G, and 21R. Images of the respective colors formed by the image display devices 21B, 21G, and 21R are synthesized with the dichroic prism 106 and projected onto the screen 30 through the projection lens 24.

The light quantity detector 40 may be disposed, for example, behind the dichroic color separation filter 103. The blue light, the green light, and the red light emitted from the plurality of light source sections 10B, 10G, and 10R enter the light quantity detector 40, as temporally and spatially common light.

In the present embodiment, a configuration of a control system of the projection-type display may include the main controller 90, the image-display-device control circuit 91, and the light source driver 92, substantially similarly to that illustrated in FIG. 2. In the present embodiment, the image-display-device control circuit 91 controls each of the image display devices 21B, 21G, and 21R, on the basis of an inputted image signal.

[6.2 Light Emission Timing of Light Source Section and Light-Quantity Sampling Operation]

Light emission timing of the light source section and light-quantity sampling operation may be performed, for example, as illustrated in FIG. 12. FIG. 12 illustrates a light emission timing signal of the red light, a light emission timing signal of the green light, and a light emission timing signal of the blue light, in order from top. A horizontal axis indicates time, and a vertical axis indicates a signal value, of the light emission timing signal in FIG. 12. Periods in which the light emission timing signals of the respective color rays are high are light emission periods Tr1, Tg1, and Tb1 of the respective color rays, and periods in which the light emission timing signals of the respective color rays are low are light extinguished periods Tr0, Tg0, and Tb0 of the respective color rays. Sb indicates a detection value (a sampling value) of a light quantity of the blue light, Sg indicates a sampling value for the green light, and Sr indicates a sampling value for the red light, obtained by the light quantity detector 40.

In the present embodiment, it is possible to sample the light quantity of each of the light source sections by a technique similar to the technique illustrated in FIG. 6.

In the present embodiment, the main controller 90 causes the plurality of light source sections 10B, 10G, and 10R to emit rays simultaneously, in a period except for a period for measurement of the light quantity of each of the color rays. In the period for measurement of the light quantity of each of the color rays, only one light source section that emits a color ray to be measured among the plurality of light source sections 10B, 10G, and 10R is extinguished for a predetermined period. The main controller 90 calculates the light quantity of the ray emitted by the one light source section, on the basis of a difference between a detection result of the light quantity detector 40 in a case where all the plurality of light source sections 10B, 10G, and 10R emit light and a detection result of the light quantity detector 40 in a case where only the one light source section is extinguished.

In the example in FIG. 12, first, the red light source section 10R is extinguished for a predetermined period. A sampling value of a light quantity obtained when the red light source section 10R is extinguished is then subtracted from a sampling value of a light quantity obtained when all the plurality of light source sections 10B, 10G, and 10R emit light, and the sampling value Sr of a light quantity of the red light is thereby calculated.

Subsequently, the green light source section 10G is extinguished for a predetermined period. A sampling value of a light quantity obtained when the green light source section 10G is extinguished is then subtracted from a sampling value of a light quantity obtained when all the plurality of light source sections 10B, 10G, and 10R emit light, and the sampling value Sg of a light quantity of the green light is thereby calculated. Subsequently, with a similar technique, the sampling value Sb of a light quantity of the blue light is calculated by extinguishing the blue light source section 10B for a predetermined period.

It is to be noted that the period during which the laser light source is extinguished for sampling may be preferably 1000 μs or less, as with the second embodiment.

In addition, in the present embodiment as well, the gain of the light quantity detector 40 may be changed for each of the color rays, according to a timing of obtaining a sampling value of a light quantity of each of the color rays.

[6.3 Effects]

According to the present embodiment, it is possible to precisely measure light quantities of the plurality of color rays with the one light quantity detector 40, by allowing the plurality of color rays to enter the one light quantity detector 40 in a spatially-common manner, and extinguishing only one light source section that emits a color ray to be measured among the plurality of light source sections for a predetermined period, in a so-called three-plate projection-type display.

7. Other Embodiments

The technology of the disclosure is not limited to the description of each of the above-described embodiments, and it is possible to implement various modifications. For example, the technology may adopt the following configurations.

(1)

A light source unit including:

a plurality of light source sections that emit rays of colors different from each other;

a light quantity detector that receives the rays of colors emitted by the plurality of light source sections in a spatially-common manner; and a controller that controls a light emission timing of each of the plurality of light source sections and a gain of the light quantity detector, and measures light quantities of the respective rays of colors at different timings and with different gains on the basis of a detection result of the light quantity detector.

(2)

The light source unit according to (1), in which the controller controls the plurality of light source sections to cause light emission periods of the respective rays of colors to be temporally different from each other.

(3)

The light source unit according to (2), in which among the plurality of light source sections, at least one predetermined light source section has a plurality of light sources that emit rays of a predetermined same color, and the controller measures light quantities of rays emitted by the respective plurality of light sources at timings different from each other, by extinguishing at least one light source among the plurality of light sources for a predetermined period, within a light emission period of the ray of the predetermined color in the predetermined light source section.

(4)

The light source unit according to (3), in which the predetermined light source section has three or more light sources that emit rays of a predetermined same color, and the controller calculates, on the basis of a difference between a detection result of the light quantity detector upon light emission of all of the plurality of light sources and a detection result of the light quantity detector upon extinguishment of a specific one light source among the plurality of light sources, a light quantity of a ray emitted by the specific one light source.

(5)

The light source unit according to (3), in which, in each of a plurality of light emission periods of the ray of the predetermined color in the predetermined light source section, the controller extinguishes at least one light source among the plurality of light sources for a predetermined period, and thereby measures the light quantity of the ray emitted by each of the plurality of light sources a plurality of times at timings different from each other, over the plurality of light emission periods.

(6)

The light source unit according to (5), in which the controller causes timings of extinguishing the at least one light source to be different from each other between the respective light emission periods.

(7)

The light source unit according to any one of (3) to (6), in which, in the light emission period, the period during which the at least one light source is extinguished is 1000 µs or less.

(8)

The light source unit according to (1), in which the controller causes the plurality of light source sections to emit the rays simultaneously, in a period except for a period in which the measurement of the light quantity of each of the rays of colors is performed, and extinguishes only one light source section that emits a ray of color to be measured among the plurality of light source sections for a predetermined period, in the period in which the measurement of the light quantity of each of the rays of colors is performed.

(9)

The light source unit according to (8), in which the controller calculates, on the basis of a difference between a detection result of the light quantity detector upon light emission of all of the plurality of light source sections and a detection result of the light quantity detector upon extinguishment of only the one light source section, a light quantity of a ray emitted by the one light source section.

(10)

The light source unit according to (8) or (9), in which the period during which the one light source section is extinguished is 1000 µs or less.

(11)

A light source unit including:

a plurality of light source sections that emit rays of colors different from each other;

a light quantity detector that receives the rays of colors emitted by the plurality of light source sections in a spatially-common manner; and a controller that controls a light emission timing of each of the plurality of light source sections, and measures light quantities of the respective rays of colors at different timings on the basis of a detection result of the light quantity detector, in which the controller causes the plurality of light source sections to emit the rays simultaneously, in a period except for a period in which the measurement of the light quantity of each of the rays of colors is performed, and extinguishes only one light source section that emits the ray of color to be measured among the plurality of light source sections for a predetermined period, in the period in which the measurement of the light quantity of each of the rays of colors is performed.

(12)

The light source unit according to (11), in which the controller calculates, on the basis of a difference between a detection result of the light quantity detector upon light emission of all of the plurality of light source sections and a detection result of the light quantity detector upon extinguishment of only the one light source section, a light quantity of the ray emitted by the one light source section.

(13)

The light source unit according to (11) or (12), in which the period during which the one light source section is extinguished is 1000 µs or less.

(14)

A projection-type display including:

a plurality of light source sections that emit rays of colors different from each other;

at least one image display device that modulates the rays of colors emitted by the plurality of light source sections on the basis of an image signal, and outputs the modulated rays;

a light quantity detector that receives the rays of colors in a spatially-common manner; and a controller that controls a light emission timing of each of the plurality of light source sections and a gain of the light quantity detector, and measures light quantities of the respective rays of colors at different timings and with different gains on the basis of a detection result of the light quantity detector.

(15)

A projection-type display including:
a plurality of light source sections that emit rays of colors different from each other;
a plurality of image display devices that modulate the respective rays of colors emitted by the plurality of light source sections, on the basis of an image signal, and output the respective modulated rays for the respective rays of colors;
a light quantity detector that receives the rays of colors in a spatially-common manner; and
a controller that controls a light emission timing of each of the plurality of light source sections, and measures light quantities of the respective rays of colors at different timings on the basis of a detection result of the light quantity detector, in which
the controller causes the plurality of light source sections to emit the rays simultaneously, in a period except for a period in which the measurement of the light quantity of each of the rays of colors is performed, and extinguishes only one light source section that emits a ray of color to be measured among the plurality of light source sections for a predetermined period, in the period in which the measurement of the light quantity of each of the rays of colors is performed.

The present application is based on and claims priority from Japanese Patent Application No. 2014-237818 filed in the Japan Patent Office on Nov. 25, 2014, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A projector, comprising:
a plurality of light source sections configured to emit first rays of a plurality of colors, wherein
a first light source section of the plurality of light source sections is configured to emit second rays of a first color of the plurality of colors,
a second light source section of the plurality of light source sections is configured to emit third rays of a second color of the plurality of colors,
the first color is different from the second color, and
the first light source section includes:
a first light source configured to emit the second rays of the first color, and
a second light source configured to emit the second rays of the first color;
at least one image display device;
a light quantity detector configured to receive the emitted first rays of the plurality of colors; and
a control section configured to:
control a light emission timing of each of the plurality of light source sections;
control a light emission timing of each of the first light source and the second light source of the first light source section;
control gain values of the light quantity detector, wherein
the gain values correspond to the plurality of colors, and
the gain values are different from each other; and
measure, at first different timings, light quantities of the emitted first rays of the plurality of colors based on the gain values that are different from each other and a first detection result of the light quantity detector.

2. The projector according to claim 1, wherein
the control section is further configured to measure, at a first timing, a first light quantity of the second rays emitted by the first light source, and
the measurement of the first light quantity of the second rays is based on the first detection result of the light quantity detector.

3. The projector according to claim 2, wherein the control section is further configured to extinguish the second light source for a first time period for the measurement of the first light quantity.

4. The projector according to claim 3, wherein the first time period is less than a light emission period of the rays emitted by each of the first light source and the second light source.

5. The projector according to claim 4, wherein
the control section is further configured to measure, at a second timing, a second light quantity of the second rays emitted by the second light source, and
the measurement of the second light quantity of the second rays is based on extinguishment of the first light source for the first time period.

6. The projector according to claim 1, wherein the at least one image display device is configured to:
modulate the first rays of the plurality of colors emitted by the plurality of light source sections, wherein the modulation of the first rays is based on an image signal, and
output the modulated first rays of the plurality of colors.

7. The projector according to claim 1, wherein the control section is further configured to control the plurality of light source sections to emit the first rays of the plurality of colors with different light emission time periods.

8. The projector according to claim 1, wherein
the first light source section of the plurality of light source sections further includes a third light source,
the third light source is configured to emit the second rays of the first color,
the control section is further configured to calculate a light quantity of the second rays emitted by one of the first light source, the second light source, or the third light source,
the calculation of the light quantity of the second rays is based on a difference between a second detection result of the light quantity detector and a third detection result of the light quantity detector,
the second detection result is based on the second rays emitted by the first light source section, and
the third detection result is based on extinguishment of the one of the first light source, the second light source, or the third light source.

9. The projector according to claim 8, wherein
in each of a plurality of light emission periods of the second rays of the first color, the control section is further configured to:
extinguish at least one of the first light source, the second light source, or the third light source for a first time period; and
measure, at second different timings over the plurality of light emission periods, light quantities of the second rays emitted by each of the first light source, the second light source, and the third light source, and
the light quantities of the second rays are measured for a plurality of times.

10. The projector according to claim 9, wherein the control section is further configured to control the extinguishment of the at least one of the first light source, the second light source, or the third light source at third different timings that are within a corresponding light emission period of the plurality of light emission periods.

11. The projector according to claim 3, wherein the first time period is one of equal to 1000 µs or less than 1000 µs.

12. The projector according to claim 1, wherein
the control section is further configured to:
control the plurality of light source sections to concurrently emit the first rays in a first time period except for a second time period, wherein in the second time period, the light quantities of the emitted first rays of the plurality of colors are measured; and
extinguish at least one light source section of the plurality of light source sections in the second time period, and
the at least one light source section of the plurality of light source sections is configured to emit fourth rays of same color for a third time period.

13. The projector according to claim 12, wherein
the control section is further configured to calculate a light quantity of the fourth rays emitted by the at least one light source section of the plurality of light source sections,
the light quantity of the fourth rays is based on a difference between a second detection result of the light quantity detector and a third detection result of the light quantity detector,
the second detection result is based on light emission of the plurality of light source sections, and
the third detection result is based on the extinguishment of the at least one light source section.

14. The projector according to claim 12, wherein the second time period is one of equal to 1000 µs or less than 1000 µs.

15. The projector according to claim 1, wherein
the control section is further configured to:
control the plurality of light source sections to concurrently emit the first rays in a first time period except for a second time period, wherein in the second time period, the light quantities of the emitted first rays of the plurality of colors are measured; and
extinguish one of the plurality of light source sections in the second time period, and
the one of the plurality of light source sections is further configured to emit fourth rays of same color for a third time period.

16. The projector according to claim 15, wherein the control section is further configured to calculate a light quantity of the fourth rays emitted by the one of the plurality of light source sections, wherein
the light quantity of the fourth rays is based on a difference between a second detection result of the light quantity detector and a third detection result of the light quantity detector,
the second detection result is based on light emission of the plurality of light source sections, and
the third detection result is based on the extinguishment of the one of the plurality of light source sections.

17. The projector according to claim 15, wherein the second time period is one of equal to 1000 µs or less than 1000 µs.

18. A projector, comprising:
a plurality of light source sections configured to emit first rays of a plurality of colors, wherein
a first light source section of the plurality of light source sections is configured to emit second rays of a first color of the plurality of colors,
a second light source section of the plurality of light source sections is configured to emit third rays of a second color of the plurality of colors,
the first color is different from the second color, and
the first light source section includes:
a first light source configured to emit the second rays of the first color, and
a second light source configured to emit the second rays of the first color;
at least one image display device;
a light quantity detector configured to receive the emitted first rays of the plurality of colors; and
a control section configured to:
control a light emission timing of each of the plurality of light source sections;
control a light emission timing of each of the first light source and the second light source of the first light source section;
control gain values of the light quantity detector, wherein
the gain values correspond to the plurality of colors, and
the gain values are different from each other;
measure, at different timings, light quantities of the emitted first rays of the plurality of colors based on the gain values that are different from each other and a detection result of the light quantity detector;
measure, at a specific timing, a light quantity of the second rays emitted by the first light source, wherein the measurement of the light quantity of the second rays is based on the detection result of the light quantity detector; and
extinguish the second light source for a specific time period for the measurement of the light quantity of the second rays emitted by the first light source.

19. A projector, comprising:
a plurality of light source sections configured to emit first rays of a plurality of colors, wherein
a first light source section of the plurality of light source sections is configured to emit second rays of a first color of the plurality of colors,
a second light source section of the plurality of light source sections is configured to emit third rays of a second color of the plurality of colors, and
the first color is different from the second color;
at least one image display device;
a light quantity detector configured to receive the emitted first rays of the plurality of colors; and
a control section configured to:
control a light emission timing of each of the plurality of light source sections;
control gain values of the light quantity detector, wherein
the gain values correspond to the plurality of colors, and
the gain values are different from each other;
measure, at different timings, light quantities of the emitted first rays of the plurality of colors based on the gain values that are different from each other and a detection result of the light quantity detector;
control the plurality of light source sections to concurrently emit the first rays in a first time period except for a second time period, wherein in the second time period, the light quantities of the emitted first rays of the plurality of colors is are measured; and extinguish at least one light source section of the plurality of light source sections in the second time period, wherein the at least one light source section of the plurality of light source sections is configured to emit fourth rays of same color for a third time period.

* * * * *